United States Patent
Marks et al.

(10) Patent No.: US 10,824,574 B2
(45) Date of Patent: Nov. 3, 2020

(54) MULTI-PORT STORAGE DEVICE MULTI-SOCKET MEMORY ACCESS SYSTEM

(71) Applicant: Dell Products L.P., Round Rock, TX (US)

(72) Inventors: Kevin Thomas Marks, Georgetown, TX (US); Austin Patrick Bolen, Austin, TX (US); William Price Dawkins, Lakeway, TX (US); William Emmett Lynn, Round Rock, TX (US); Gary Benedict Kotzur, Austin, TX (US); Robert W. Hormuth, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/361,775

(22) Filed: Mar. 22, 2019

(65) Prior Publication Data

US 2020/0301857 A1 Sep. 24, 2020

(51) Int. Cl.
*G06F 3/06* (2006.01)
*G06F 13/16* (2006.01)
*G06F 13/40* (2006.01)

(52) U.S. Cl.
CPC ........ *G06F 13/1668* (2013.01); *G06F 3/0604* (2013.01); *G06F 3/0659* (2013.01); *G06F 3/0679* (2013.01); *G06F 13/4027* (2013.01)

(58) Field of Classification Search
None
See application file for complete search history.

(56) References Cited

U.S. PATENT DOCUMENTS

| | | | | |
|---|---|---|---|---|
| 7,500,067 B2* | 3/2009 | Rangarajan | ......... | G06F 12/0646 711/147 |
| 7,725,609 B2* | 5/2010 | Oh | ...................... | G06F 13/1663 710/3 |
| 8,788,883 B2* | 7/2014 | Wang | .................. | G06F 11/1417 714/36 |
| 2007/0156947 A1* | 7/2007 | Vaithiananthan | ... | G06F 12/1072 711/5 |
| 2007/0204113 A1* | 8/2007 | Landry | ................... | G06F 13/28 711/154 |

(Continued)

*Primary Examiner* — Elias Mamo
(74) *Attorney, Agent, or Firm* — Haynes and Boone, LLP

(57) ABSTRACT

A multi-port storage device multi-socket memory access system includes a plurality of processing subsystems interconnected by at least one processing subsystem interconnect, a respective local memory subsystem for each of the processing subsystems, and a storage system that provides a respective connection to each of the processing subsystems. The storage system receives a memory access command and uses it to determine a first local memory subsystem that includes a memory location that is identified in the memory access command. The storage system then uses a connection mapping to identify a first connection to a first processing subsystem for which the first local memory subsystem is provided. The storage system then accesses the first memory subsystem through the first connection, via the first processing system, and without utilizing the at least one processing subsystem interconnect, in order to execute the memory access command.

17 Claims, 10 Drawing Sheets

(56) References Cited

U.S. PATENT DOCUMENTS

| | | | |
|---|---|---|---|
| 2011/0197031 A1* | 8/2011 | Aho | G06F 12/0844 |
| | | | 711/130 |
| 2014/0351546 A1* | 11/2014 | Lichnnanov | G06F 12/06 |
| | | | 711/170 |
| 2019/0163644 A1* | 5/2019 | Jayasena | G06F 12/1027 |

* cited by examiner

MULTI-PORT STORAGE DEVICE MULTI-SOCKET MEMORY ACCESS SYSTEM

BACKGROUND

The present disclosure relates generally to information handling systems, and more particularly to accessing memory by a multi-port storage device in an information handling system via a multi-socket processing system in that information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, utilize storage devices for storing data. As it is always desirable to improve the performance of such server devices, techniques for improving the performance of its associated storage devices are desirable as well. For example, processing systems including multiple processor devices, memory systems including Storage Class Memory (SCM) devices, and Solid State Drive (SSD) storage devices may be provided in server devices in configurations that have been found to exhibit less than optimal performance, and it is desirable to optimize the performance of such configurations in order to increase the performance of the server device.

In a specific example, the processing system may include two processor devices coupled together by a processor interconnect (e.g., an Ultra Path Interconnect (UPI) provided in processing systems available from INTEL® Corporation of Santa Clara, Calif., United States), the memory system may provide a respective memory subsystem for each processor device (with each respective memory subsystem often called the "local memory" for its associated processor device), and the processing system/memory system configured in a Non-Uniform Memory Access (NUMA) design in which the memory access time depends on the memory subsystem location relative to the processor device, with processor devices capable of accessing their local memory subsystem faster than non-local memory subsystems (i.e., the memory subsystem that is local to the other processor device.) In such an example, a dual port SSD storage device may have each of its respective ports connected to one of the processor devices, with storage controller(s) in the SSD storage device accessing the memory subsystems provided for each of the processor devices via one of those ports.

However, accessing the memory subsystems in such a configuration can introduce latency associated with having to utilize the processor interconnect between the processing devices. For example, when an Input/Output (I/O) command is received by one of the processing devices (the "first processing device"), the first processing device will store that command in its local memory subsystem, and will send a notification via its coupling to one of the ports (the "first port") on the SDD storage device. The storage controller(s) in the SSD storage device are configured to perform Direct Memory Access (DMA) via the port upon which commands are received and, as such, the storage controller that receives the notification will retrieve the command from the local memory subsystem for the first processing device via the first port, determine which memory subsystem must be accessed according to the command, and will then access that memory subsystem via the first port. As such, if the memory subsystem that is local to the other of the processing devices (the "second processing device") must be accessed according to the command, the storage controller will perform the DMA via the first port, the first processing device, the processor interconnect, and the second processing system in order to access that memory subsystem. Performing DMA by the SSD storage device via the processor interconnect can introduce latency in the DMA, particularly when it occurs at the same time that the processing devices are performing a relatively high number of memory access operations (to each others local memory subsystems) via the processor interconnect (which is the primary purpose of the processor interconnect.)

Accordingly, it would be desirable to provide an improved multi-port storage device multi-socket memory access system.

SUMMARY

According to one embodiment, an Information Handling System (IHS) includes a storage device processing system; and a storage device memory system that is coupled to the storage device processing system and that includes instructions that, when executed by the storage device processing system, cause the storage device processing system to provide at least one storage controller that is configured to: receive a memory access command; determine, using a memory mapping, a first local memory subsystem that includes a memory location that is identified in the memory access command; identify, using a connection mapping, a first connection to a first processing subsystem for which the first local memory subsystem is provided; and access the first memory subsystem through the first connection, via the first processing system, and without utilizing at least one processing subsystem interconnect that connects the first processing subsystem to at least one second processing subsystem, in order to execute the memory access command.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
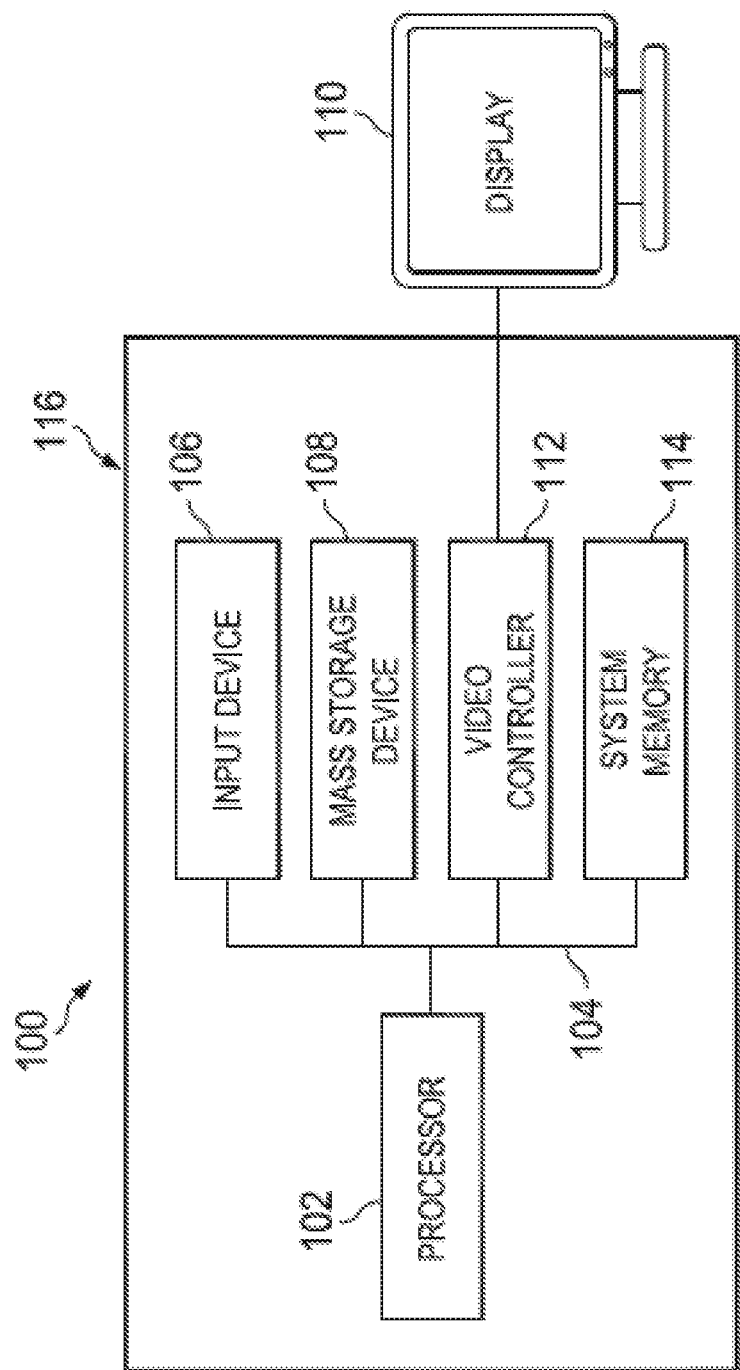
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
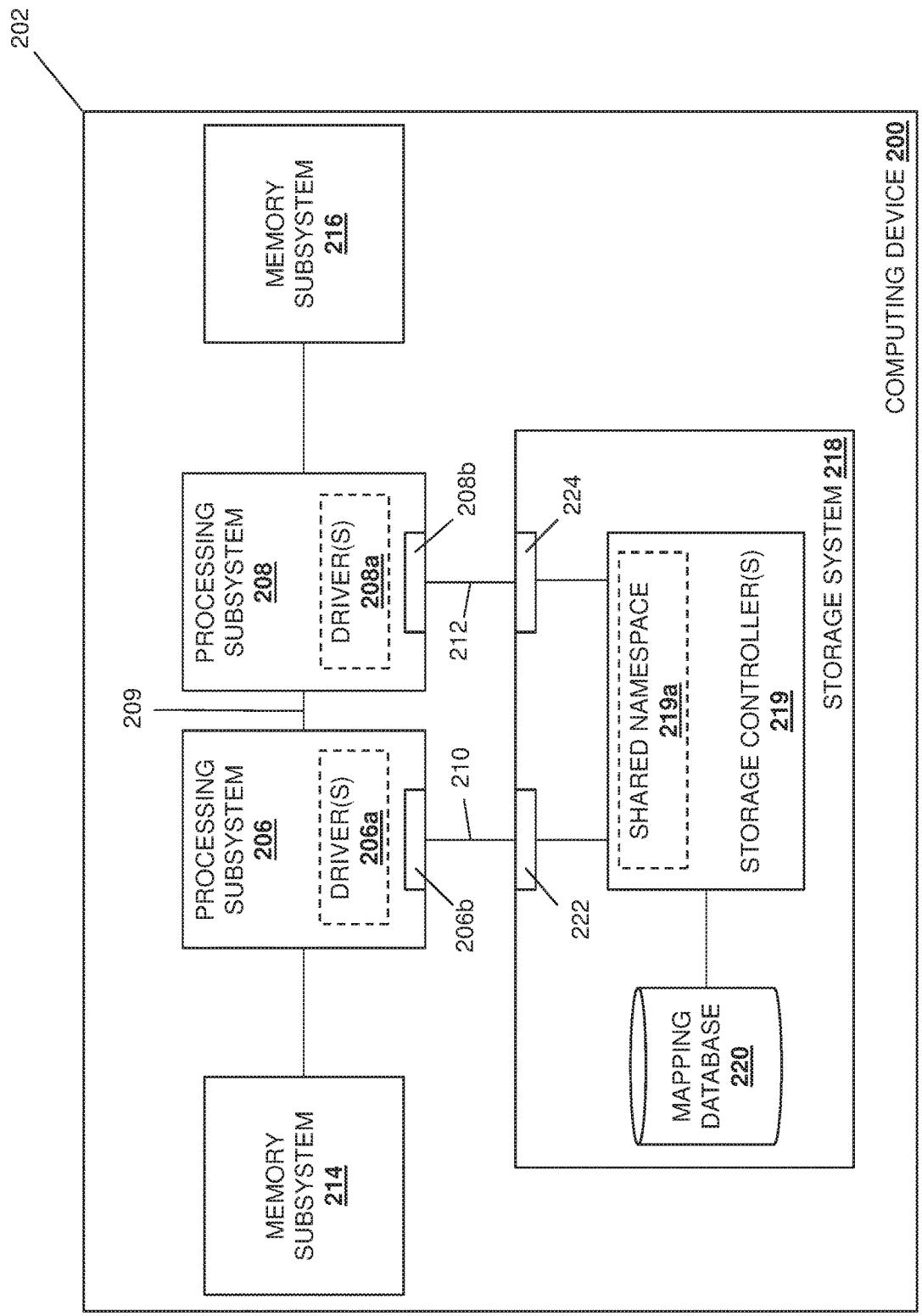
FIG. 2 is a schematic view illustrating an embodiment of a computing device that provides the multi-port storage device multi-socket memory access system of the present disclosure.

Referring now to FIG. 2, an embodiment of a computing device 200 is illustrated that provides the multi-port storage device multi-socket memory access system of the present disclosure. The computing device 200 may be provided by the IHS 100 discussed above with reference to FIG. 1 and/or may include some or all of the components of the IHS 100. While the computing device is illustrated and discussed below as provided by a server device, one of skill in the art in possession of the present disclosure will recognize that the functionality of the computing device 200 discussed below may be provided by networking devices, desktop computing devices, laptop/notebook computing devices, tablet devices, mobile phones, and/or other devices that are configured to operate similarly as discussed below. In the illustrated embodiment, the computing device 200 includes a chassis 202 that houses the components of the computing device 200, only some of which are illustrated below.

In the illustrated example, the chassis 202 houses a processing system that is a dual-processor system including the processing subsystem 206 and the processing subsystem 208 that are coupled together by a processing subsystem interconnect 209 (e.g., the UPI discussed above), and each of which may include the processor 102 discussed above with reference to FIG. 1. However, while a dual-processor system is illustrated and described herein, one of skill in the art in possession of the present disclosure in the art will recognize how the teachings of the present disclosure may be extended to multi-processor systems discussed below in a manner that would be apparent to one of skill in the art in possession of the present disclosure. In a specific example, the processor subsystems 206 and 208 may be provided by Non-Uniform Memory Access (NUMA) processing nodes, with the processor subsystem 206 providing a first NUMA processing node (e.g., "NUMA node 0") and the processor subsystem 208 providing a second NUMA processing node (e.g., "NUMA node 1") that is coupled to the first NUMA processing node via the processing subsystem interconnect/UPI 209. However, while particular processor subsystems have been described, one of skill in the art in possession of the present disclosure will recognize that other processor subsystems will fall within the scope of the present disclosure as well.

As discussed below, the processing subsystem 206 may be configured to execute instructions to provide one or more drivers 206a, and the processing subsystem 208 may be configured to execute instructions to provide one or more drivers 208a. For example, the driver(s) 206a and 206b may include a multi-pathing driver that is configured to present the multi-port storage system discussed below to an operating system as a single storage system with a plurality of namespaces, a storage system driver (e.g., an NVMe storage device driver) that is configured to operate and control the multi-port storage system (e.g., a connected NVMe storage device), and/or a variety of other drivers that would be apparent to one of skill in the art in possession of the present disclosure. As would be understood by one of skill in the art in possession of the present disclosure, the driver(s) 206a and 208a may change based on the operating system and/or other components of the computing device 200. Furthermore, in the illustrated embodiment, each of the processing subsystems 206 and 208 includes a respective port 206b and 208b (e.g., a Peripheral Component Interconnect express (PCIe) root port) that, as discussed below, may couple to respective connections 210 and 212 (e.g., PCIe buses) to the multi-port storage system discussed below.

The chassis 202 may also houses a memory system that provides a local memory subsystem for each of the processing subsystems in the processing system. As such, in the illustrated embodiment, a memory subsystem 214 is provided as the local memory subsystem for the processing subsystem 206, and a memory subsystem 216 is provided as the local memory subsystem for the processing subsystem 208. In a specific example, the memory subsystems 214 and 216 may be host memory subsystems provided by Storage Class Memory (SCM) devices and/or other memory devices known in the art. One of skill in the art in possession of the present disclosure will recognize that the processing systems 206 and 208 and their respective local memory subsystems 214 and 216 illustrated in FIG. 2 provide an example of a NUMA configuration in which local memory subsystems are provided for each processing subsystem in a multi-processor system, and memory subsystem access times depend on the relative location of the memory subsystem and the processing subsystem performing the memory access operations, with processing subsystems able to access their local memory subsystems faster than memory subsystems that are not local (i.e., memory subsystems that are local to another processing subsystem.) However, while a NUMA memory design is illustrated and discussed below, other processing system/memory system configurations may benefit from the teachings of the present disclosure and thus are envisioned as falling within its scope as well.

The chassis 202 may also house a storage system 218 that, in the examples discussed below, is provided by a Solid State Drive (SSD) storage device such as a Non-Volatile Memory express (NVMe) storage device, but one of skill in the art in possession of the present disclosure will recognize that the storage device may be provided by a variety of other storage devices while remaining within the scope of the present disclosure as well. The storage system 218 may include a storage device processing system (not illustrated) that is coupled to a storage device memory system (not illustrate) that includes instructions that, when executed by the storage device processing system, cause the storage device processing system to provide one or more storage controllers 219. As such, in examples such as those mentioned above in which the storage device is an NVMe storage device, the storage controller(s) 219 may include one or more NVMe controller(s), discussed in further detail below. In the illustrated embodiment, the storage controller(s) 219 are coupled to a mapping database 220 that, as discussed below, may store one or more mappings or other data structures utilized by the storage controller(s) 219 to perform the memory access functionality discussed below. While the mapping database 220 is illustrated as stored in the storage system 218, one of skill in the art in possession of the present disclosure will recognize that, in some embodiments, the mapping database 220 may be provided outside of the storage system 218 (and accessible to the storage controller(s) 218 in the storage system 218) while remaining within the scope of the present disclosure as well.

In the examples illustrated and discussed below, the storage system 218 is a dual-port storage system (e.g., a dual-port NVMe SSD storage device) and, as such, a pair of ports 222 and 224 are provided on the storage system 218, with the port 222 coupled to the processing subsystem 206 via the connection 210 and the port 206b, and the port 224 coupled to the processing subsystem 208 via the connection 212 and the port 208b. One of skill in the art in possession of the present disclosure will recognize that in such a dual-port storage system, a first of the storage controller(s) 219 (e.g., a first NVMe controller ("NVMe controller 0)) may be configured to present a shared namespace 219a for the storage system 218 to the processing subsystem 206, and a second of the storage controller(s) 219 (e.g., a second NVMe controller ("NVMe controller 1)) may be configured to present the shared namespace 219a for the storage system 218 to the processing subsystem 208.

However, while a dual-port storage system coupled to a dual processor system is illustrated, one of skill in the art in possession of the present disclosure will recognize that storage systems with different numbers of ports (e.g., four ports) and/or that are coupled to processor systems with different numbers of processors (e.g., a dual port storage system coupled to a quad processor system) may benefit from the teachings of the present disclosure and will fall within its scope as well. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
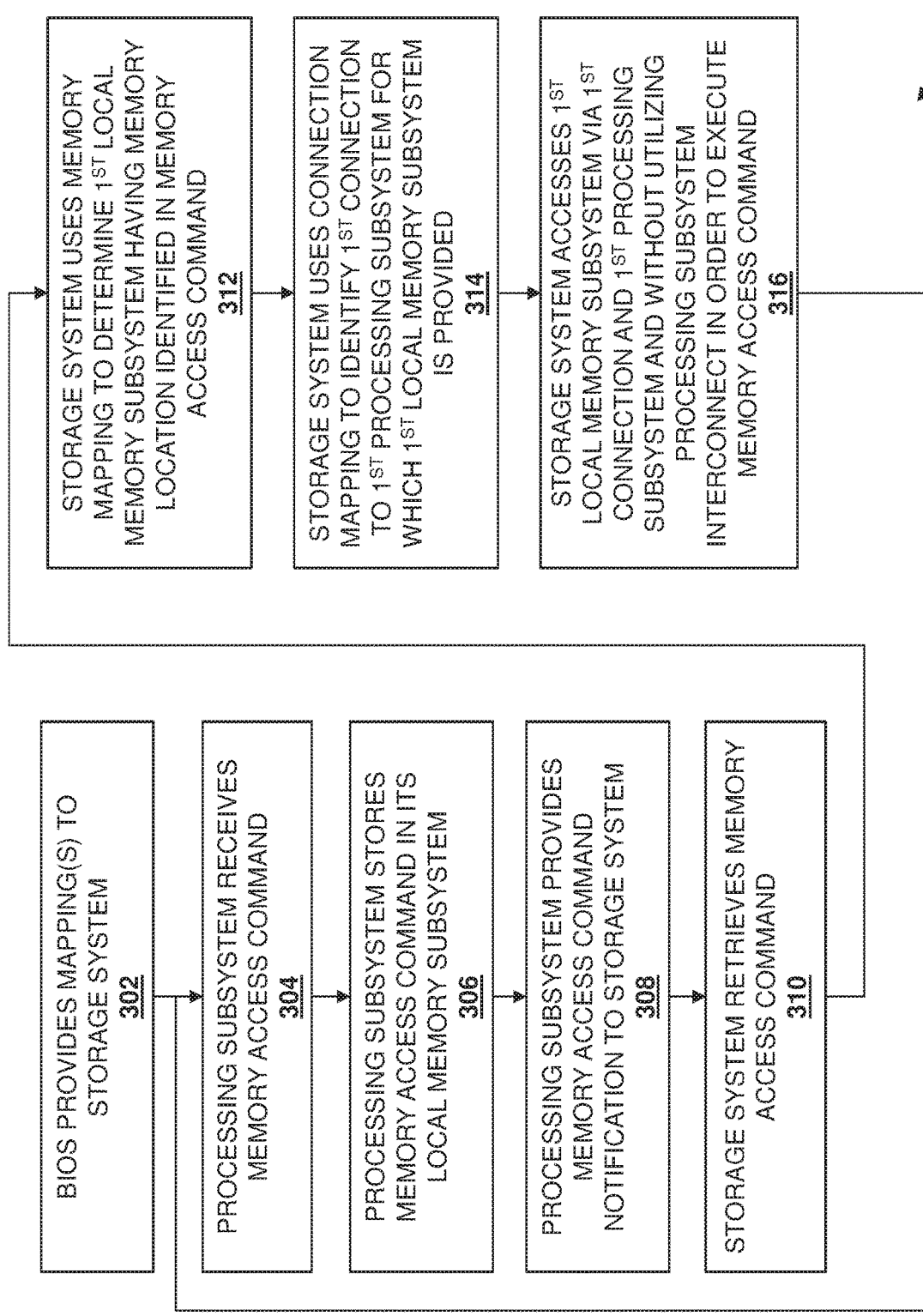
FIG. 3 is a flow chart illustrating an embodiment of a method for multi-socket memory access via a multi-port storage device.

Referring now to FIG. 3, an embodiment of a method for multi-socket memory access via a multi-port storage device is illustrated. As discussed below, the systems and methods of the present disclosure provide for efficient memory access by a storage system that has multiple ports connected to a processing system that provides a plurality of processing subsystems that are connected by a processing subsystem interconnect and that are each provided with a respective local memory subsystem. For example, a dual processor system may include a first processor having a first local memory, and a second processor that has a second local memory and that is connected to the first processor by a processor interconnect. A storage device may have a first connection via its first port to the first processor, and a second connection via its second port to the second processor. When the storage device receives a memory access command from one of the first and second processors, the storage device may access mappings in a mapping database (e.g., which may be provided by a BIOS during initialization), and may utilize a memory mapping that identifies which of the first local memory and the second location memory includes a memory location identified in the memory access command, while utilizing a connection mapping that identifies which of the first connection and the second connection is coupled to the processor for which that local memory subsystem is provided. The storage device will then execute the memory access command by accessing the local memory subsystem that includes the memory location identified in the memory access command through the connection that is coupled to the processor for which that local memory subsystem is provided, which avoids the need to use the processor interconnect provided between the first processor and the second processor. As such, storage device accesses of local memory subsystems provided for processors in a multi-processor system need not utilize the processor interconnect(s) between those processors in order to free up its use in, for example, non-local memory accesses by those processors.

The method 300 begins at block 302 where a BIOS provides mapping(s) to a storage system. In an embodiment, at block 302, the computing device 200 may be powered on, started up, reset, rebooted, and/or otherwise initialized and, in response, a Basic Input Output System (BIOS) in the computing device 200 may operate to perform a variety of initialization operations that would be apparent to one of skill in the art in possession of the present disclosure. As would be understood by one of skill in the art in possession of the present disclosure, the BIOS in the computing device 200 may be aware of (or have access to) details of the configuration of the computing device 200 (e.g., a hardware layout and/or other configuration details known in the art), which in the examples discussed below include information that describes how memory locations in the memory subsystems 214 and 216 are associated with processing subsystems 206 and 208. For example, as discussed above, the processing subsystems 206 and 208 may be provided by respective NUMA processing nodes, and one of skill in the art in possession of the present disclosure will recognize that those NUMA processing nodes may be associated with proximity domains (or other identifiers) that may be configured to associate those NUMA processing nodes with the memory locations provided by their respective local memory subsystems.

As such, at block 302 the BIOS in the computing device 200 may utilize the information discussed above (or similar information) in order to construct, create, generate, and/or otherwise provide a memory mapping that details how memory locations provided by a particular local memory subsystem are associated with the processing subsystem for which that local memory subsystem is provided. Thus, with reference to the specific example of the computing device 200 illustrated in FIG. 2, the memory mapping may identify that memory locations provided by the memory subsystem 214 are mapped or otherwise associated with the processing subsystem 206, and that memory locations provided by the memory subsystem 216 are mapped or otherwise associated with the processing subsystem 208. The BIOS in the computing device 200 may then provide the memory mapping to the storage system 218. For example, at block 302 the memory mapping may be provided to the storage controller(s) 219, and the storage controller(s) 219 may store that memory mapping in the mapping database 220. However, while the memory mapping is discussed as being generated by the BIOS and provided to the storage system 218 at block 302, one of skill in the art in possession of the present disclosure will recognize that other computing device subsystems may generate and provide the memory mapping (or similar information that enables the functionality discussed below) to the storage system 218, that the memory mapping (or similar information that enables the functionality discussed below) may be provided to the storage system 218 at different times (e.g., at times other than initialization), and/or that the information described below as "memory mapping" information may be provided for use by the storage system 218 in a variety of manners that will enable the functionality discussed below while remaining within the scope of the present disclosure as well.

Furthermore, at block 302 the BIOS in the computing device 200 may utilize the information discussed above (or similar information) in order to construct, create, generate, and/or otherwise provide a connection mapping that details how the connections 210 and 212 provide access for the storage system 218 to the processing subsystems 206 and 208. Thus, with reference to the specific example of the computing device 200 illustrated in FIG. 2, the connection mapping may identify that the port 222 on the storage system 218 provides the connection 210 between the storage system 218 and the processing subsystem 206, and that the port 224 on the storage system 218 provides the connection 212 between the storage system 218 and the processing subsystem 208. The BIOS in the computing device 200 may then provide the connection mapping to the storage system 218. For example, at block 302 the connection mapping may be provided to the storage controller(s) 219, and the storage controller(s) 219 may store that connection mapping in the mapping database 220. However, while the connection mapping is discussed as being generated by the BIOS and provided to the storage system 218 at block 302, one of skill in the art in possession of the present disclosure will recognize that other computing device subsystems may generate and provide the connection mapping (or similar information that enables the functionality discussed below) to the storage system 218, that the connection mapping (or similar information that enables the functionality discussed below) may be provided to the storage system 218 at different times (e.g., at times other than initialization), and/or that the information described below as "connection mapping" information may be provided for use by the storage system 218 in a variety of manners that will enable the functionality discussed below while remaining within the scope of the present disclosure as well.

In specific examples, the memory mapping discussed above (as well as other information providing for similar functionality) may be provided as part of an Advanced Configuration and Power Interface (ACPI) Static Resource Affinity Table (SRAT) (e.g., in a memory affinity structure included in the ACPI SRAT), and the connection mapping discussed above (as well as other information providing for similar functionality) may be provided as part of an ACPI System Locality Information Table (SLIT). However, while a few examples of specific mapping information and mapping information data structures are discussed above, one of skill in the art in possession of the present disclosure will recognize that other types of information may be utilized by the storage system 218 in other data structures in order to provide for the local memory access functionality discussed below while remaining within the scope of the present disclosure as well.

Figure 4A:
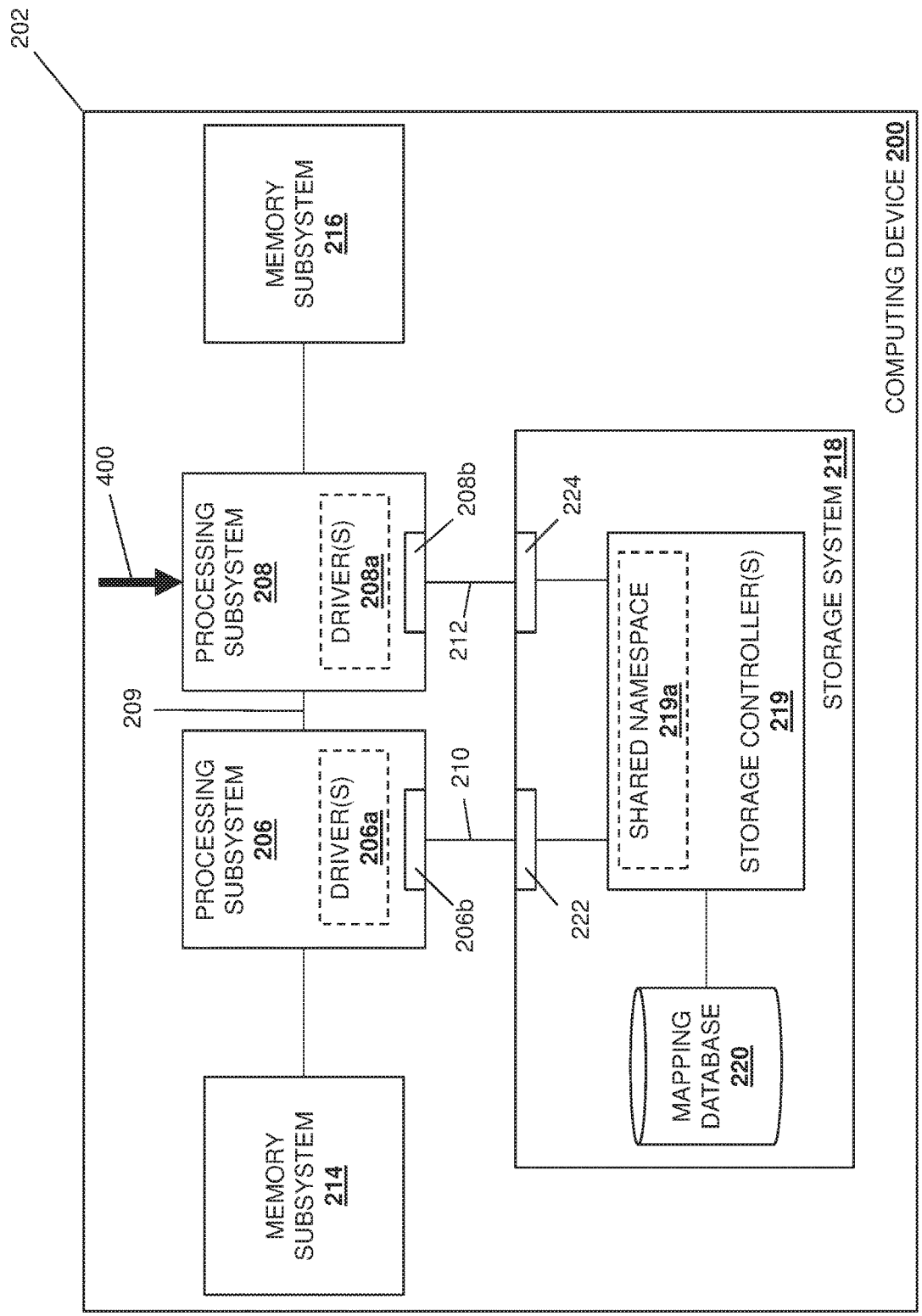
FIG. 4A is a schematic view illustrating an embodiment of the multi-port storage device multi-socket memory access system in the computing device of FIG. 2 operating during the method of FIG. 3.

The method 300 then proceeds to block 304 where a processing subsystem receives a memory access command. In an embodiment, at block 304, a processing subsystem in the computing device 200 may receive a memory access command (e.g., an Input/Output (I/O) command), a block I/O read/write command (e.g., a Submission Queue entry that includes a source or destination in the local memory subsystem(s) such as an NVMe storage device read or write command), and/or other command that includes an instruction to access (or otherwise provides for the accessing of) a local memory subsystem in the computing device 200, with that memory access command directed to the storage system 218. For example, with reference to FIG. 4A, the processing subsystem 208 is illustrated as receiving a memory access command 400. As would be understood by one of skill in the art in possession of the present disclosure, the memory access command 400 may be received from an application run by the processing system, via an input device (not illustrated) and from a user of the computing device 200, from a subsystem (not illustrated) included in the computing device 200, from a subsystem (not illustrated) outside of the computing device 200, and/or from any of a variety of memory access command sources known in the art. While the processing subsystem 208 is illustrated as receiving the memory access command 400, one of skill in the art in possession of the present disclosure will recognize that the processing subsystem 206 may receive memory access commands in a similar manner that will provide for the functionality discussed below as well.

Figure 4B:
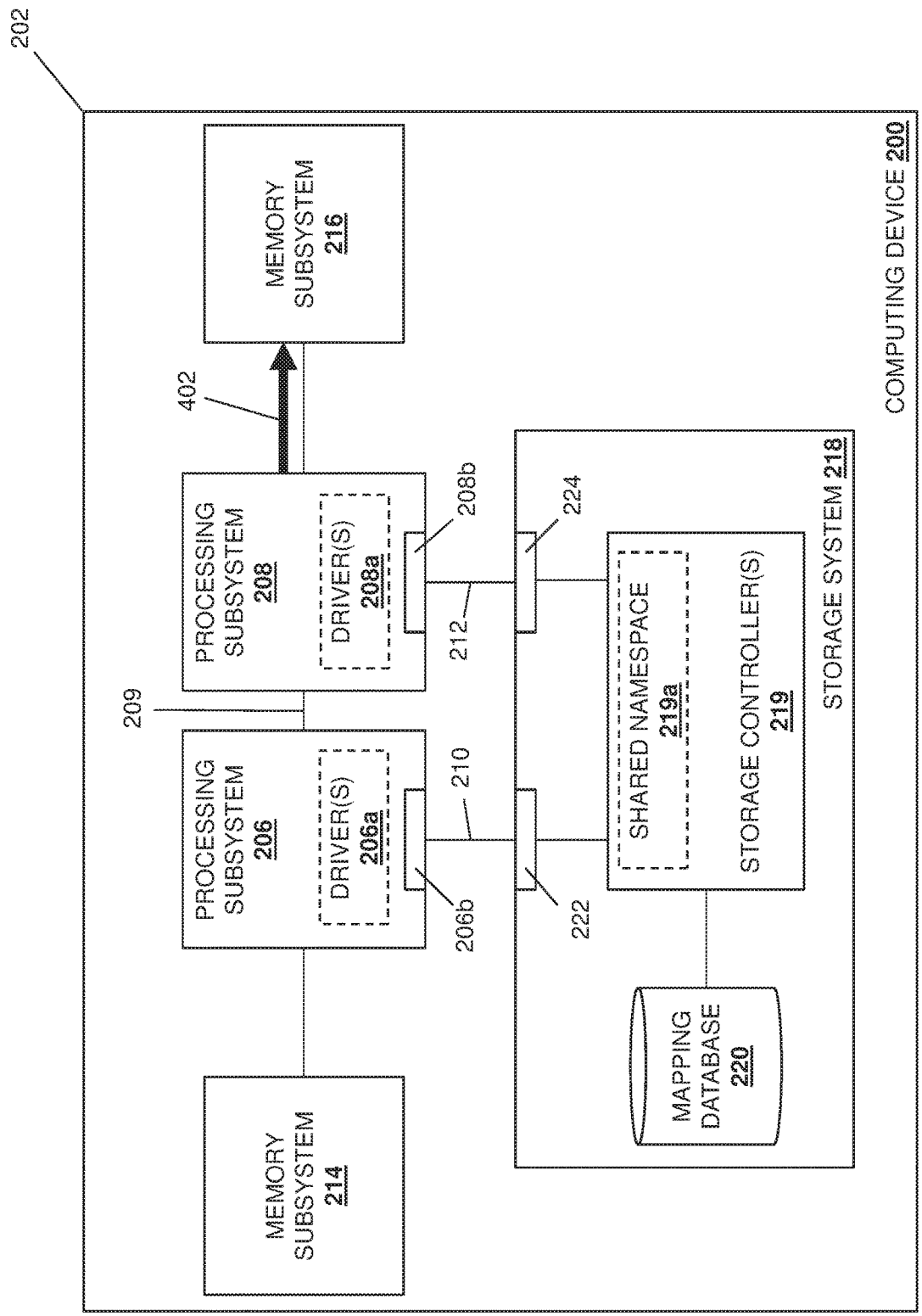
FIG. 4B is a schematic view illustrating an embodiment of the multi-port storage device multi-socket memory access system in the computing device of FIG. 2 operating during the method of FIG. 3.

The method 300 then proceeds to block 306 where the processing subsystem stores the memory access command in its local memory subsystem. In an embodiment, at block 306, the processing subsystem that received the memory access command at block 302 operates to store that memory access command in its local memory subsystem. For example, with reference to FIG. 4B, the processing subsystem 208 is illustrated as performing a storage operation 402 to store the memory access command 400 that was received at block 302 in the memory subsystem 216. While the processing subsystem 208 is illustrated as storing the memory access command 400 via the storage operation 402, one of skill in the art in possession of the present disclosure will recognize that the processing subsystem 206 may store memory access commands it receives in the memory subsystem 214 in a similar manner that will provide for the functionality discussed below as well.

Figure 4C:
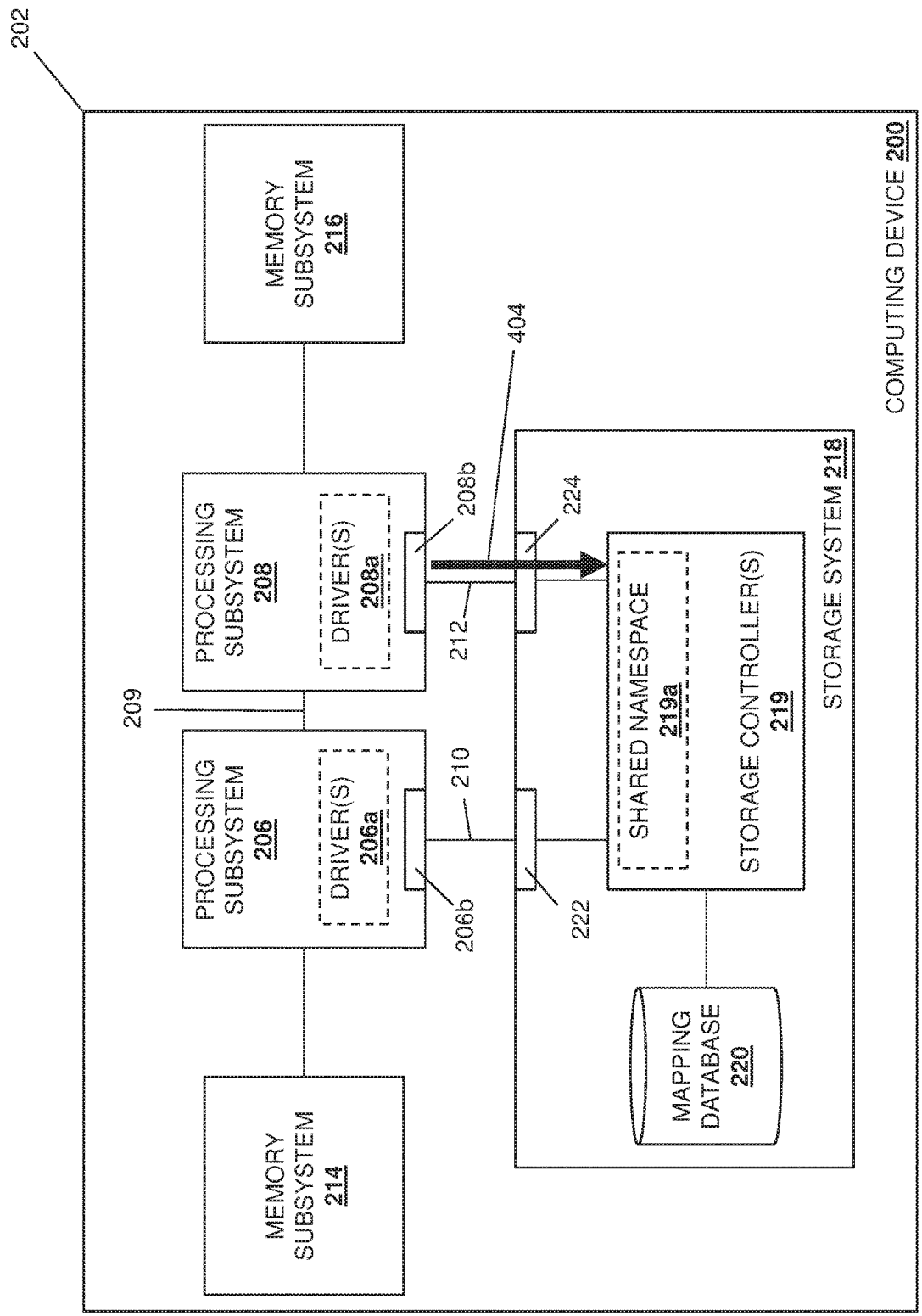
FIG. 4C is a schematic view illustrating an embodiment of the multi-port storage device multi-socket memory access system in the computing device of FIG. 2 operating during the method of FIG. 3.

The method 300 then proceeds to block 308 where the processing subsystem provides a memory access command notification to the storage system. In an embodiment, at block 308, the processing subsystem that received the memory access command at block 302 operates to notify the storage system 218 of that memory access command. For example, with reference to FIG. 4C, the processing subsystem 208 is illustrated as providing a memory access command notification 404 to the storage system 218. For example, at block 302, the driver(s) 208a provided by the processing subsystem 208 (e.g., a multipathing driver, a storage device driver (e.g., an NVMe storage device driver), etc.) may operate to select the path for providing the memory access command notification 404 to the storage system 218, which includes providing that memory access command notification 404 via the port 208b (e.g., a PCIe root port), over the connection 212 (e.g., a PCIe bus), and via the port 224 (e.g., a PCIe port) to the storage controller(s) 219. In a specific example, the storage controller(s) 219 include a plurality of storage controllers (e.g., an "NVMe controller 0" associated with the port 222, and an "NVMe controller 1" associated with the port 224), and at block 308 one of those storage controllers (e.g., "NVMe controller 1" in this example) may receive the memory access command notification 404 (e.g., ringing of a submission queue doorbell on that NVMe controller via a register write). While the processing subsystem 208 is illustrated as providing the memory access command notification 404 to the storage controller(s) 219, one of skill in the art in possession of the present disclosure will recognize that the processing subsystem 206 may provide memory access command notifications to the storage controller(s) 219 in a similar manner that will provide for the functionality discussed below as well.

Figure 4D:
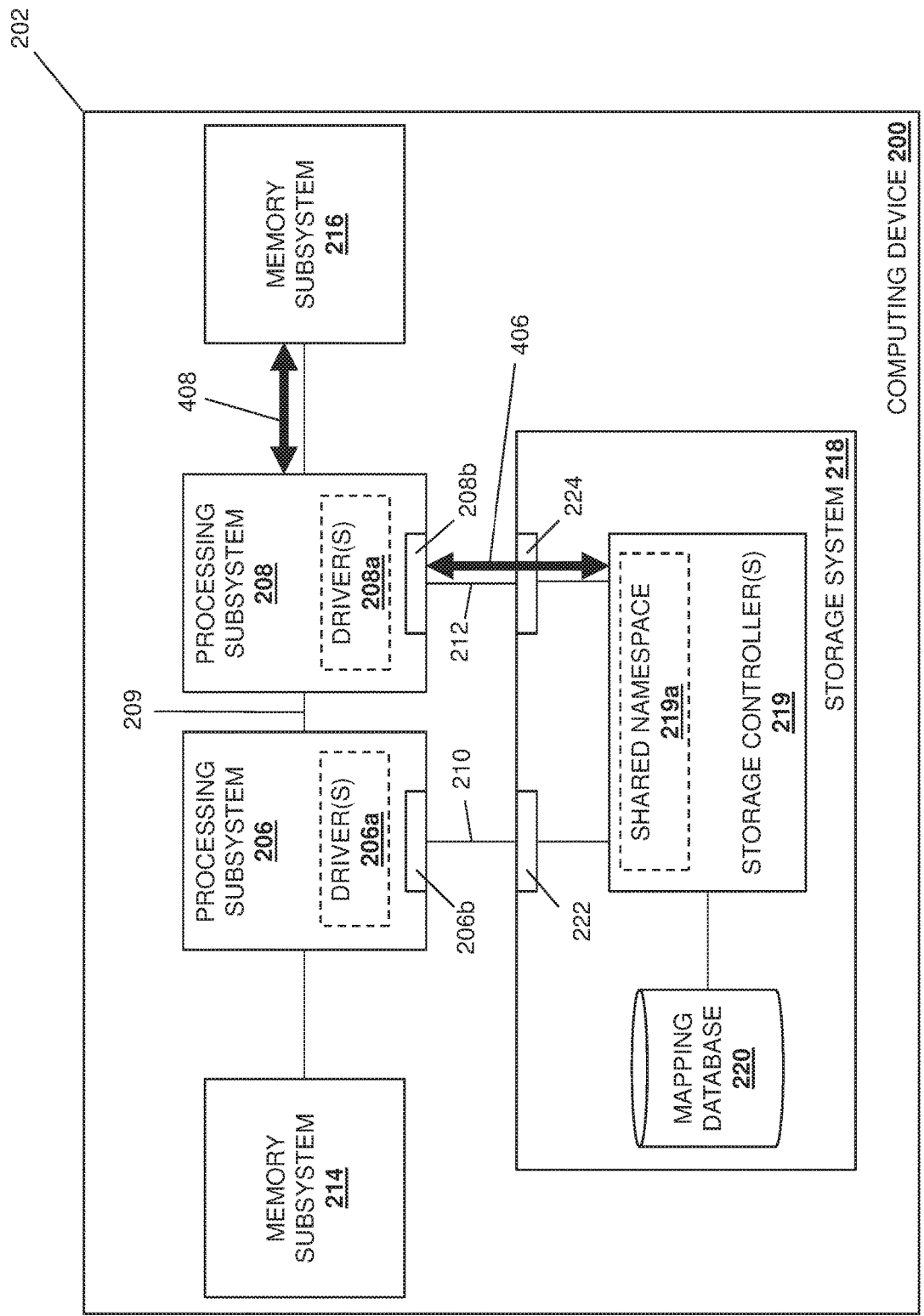
FIG. 4D is a schematic view illustrating an embodiment of the multi-port storage device multi-socket memory access system in the computing device of FIG. 2 operating during the method of FIG. 3.

The method 300 then proceeds to block 310 where the storage system retrieves the memory access command. In an embodiment, at block 310, the storage controller(s) 219 operate to retrieve the memory access command associated with the memory access command notification 404 received at block 308. With reference to FIG. 4D and continuing with the specific storage controller example provided above, one of the storage controller(s) 219 (e.g., "NVMe controller 1") is illustrated as retrieving the memory access command that was stored in the memory subsystem 216 via, in the illustrated example, the issuing a memory access command retrieval request 406 to the processing subsystem 208 via the port 224 (e.g., a PCIe port), the connection 212 (e.g., a PCIe bus), and the port 208b (e.g., a PCIe root port), which causes the processing subsystem 208 to perform a memory access command retrieval operation 408 to retrieve the memory access command from the memory subsystem 216 and provide that memory access command to that storage controller via the port 208b (e.g., a PCIe root port), over the connection 212 (e.g., a PCIe bus), and via the port 224 (e.g., a PCIe port). While the storage controller(s) 219 is illustrated as retrieving the memory access command from the memory subsystem 216 via the processing subsystem 208, one of skill in the art in possession of the present disclosure will recognize that the storage controller(s) 219 may retrieve the memory access command via the processing subsystem 206 in a similar manner that will provide for the functionality discussed below as well.

While an example has been described that uses the same storage controller (e.g., "NVMe controller 1") that received the memory access command notification to retrieve the memory access command via the processing subsystem that provided that memory access command notification and from the local memory subsystem for that processing subsystem, in other examples, a different storage controller (e.g., "NVMe controller 0") than that which received the memory access command notification (e.g., "NVMe controller 1" in this example) may retrieve the memory access command via a different processing subsystem (e.g., processing subsystem 206) than that which provided that memory access command notification (e.g., processing subsystem 208 in this example), and may retrieve the memory access command from the local memory subsystem for that processing subsystem (e.g., the memory subsystem 214 for the processing subsystem 206).

For example, a multi-pathing driver provided by the processing subsystem 208 (i.e., one of the driver(s) 208a) may operate to select storage controllers for memory access command notifications in a "round robin" fashion and, as such, the processing subsystem 208 may store a memory access command in the memory subsystem 216, while providing the memory access command notification over the processing subsystem interconnect 209 to the processing subsystem 206 such that the processing subsystem 206 provides that memory access command notification to the NVMe controller 0 discussed above via the port 206b (e.g., a PCIe root port), over the connection 210 (e.g., a PCIe bus), and via the port 222 (e.g., a PCIe port).) In a specific example, for any selected storage controller, the multi-pathing driver may identify a namespace that is presented to the selected storage controller, provide the memory access command in a queue in the memory for that storage controller, and ring a doorbell for that storage controller and that queue.

As such, in some embodiments, the NVMe controller 0 may operate at block 310 to retrieve the memory access command via the same path (e.g., by sending a memory access command retrieval request to the processing subsystem 206, which causes the processing subsystem 206 to forward that memory access command retrieval request over the processing subsystem interconnect 209 to the processing subsystem 208, which causes the processing subsystem 208 retrieve the memory access command from the memory subsystem 216, and provide that memory access command back to the processing subsystem 206 via the processing subsystem interconnect 209 so that the processing subsystem 206 provides that memory access command to the NVMe controller 0.) However, one of skill in the art in possession of the present disclosure will recognize that, in other embodiments, the NVMe controller 0 may utilize the techniques discussed below to retrieve the memory access command without utilizing the processing subsystem interconnect 209 by, for example, using the memory mapping to identify the local memory subsystem in which the memory access command was stored (discussed in further detail below with respect to block 312), using the connection mapping to identify the connection to the processing subsystem for which that local memory subsystem is provided (discussed in further detail below with respect to block 314), and retrieving that memory access command via that connection and from that local memory subsystem without using the processing subsystem interconnect 209 (discussed in further detail below with respect to block 316.) As such, using the specific example discussed above, the NVMe controller 0 may receive the memory access command notification (e.g., the doorbell discussed above) via a first port that refers to a memory access command that is stored in local memory subsystem in a queue controlled by the NVMe controller 0, but may use a different, second port to retrieve that memory access command from that queue in the local memory subsystem.

The method 300 then proceeds to block 312 where the storage system uses a memory mapping to determine a first local memory subsystem having a memory location that is identified in the memory access command. In an embodiment, at block 312, the storage controller(s) 219 may operate to determine a memory location that is identified in the memory access command that was retrieved at block 310. In the examples below, the memory access command includes an instruction to write data to one or more memory locations in the memory subsystems 214 and/or 216, but one of skill in the art in possession of the present disclosure will recognize that memory access commands that include instructions to read data from one or more memory locations in the memory subsystems 214 and/or 216, and/or that include instructions to perform any other memory access operations known in the art will fall within the scope of the present disclosure as well.

Figure 4E:
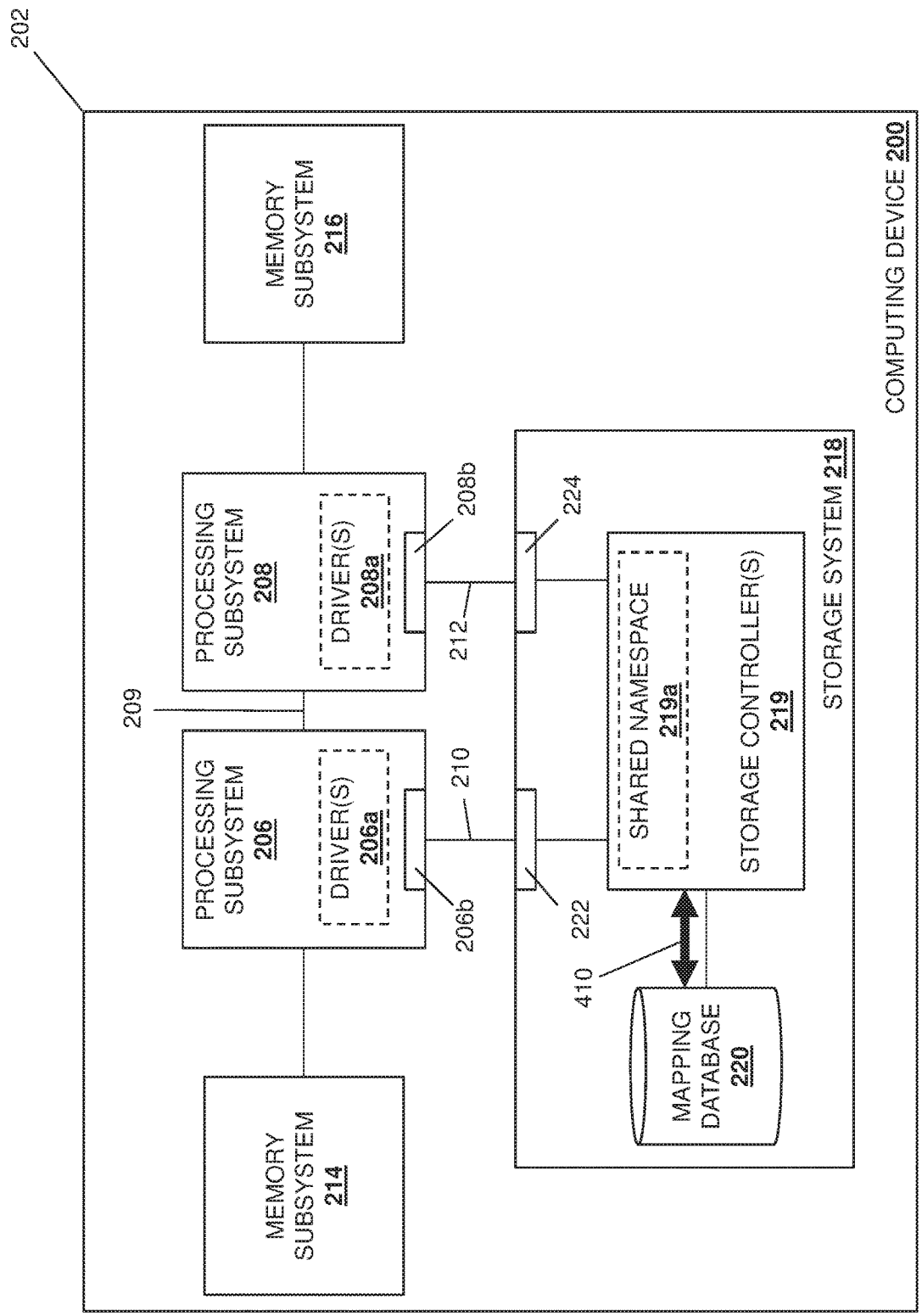
FIG. 4E is a schematic view illustrating an embodiment of the multi-port storage device multi-socket memory access system in the computing device of FIG. 2 operating during the method of FIG. 3.

With reference to FIG. 4E, at block 312 and continuing with the specific storage controller example provided above, the one of the storage controller(s) 219 that retrieved the memory access command at block 312 (e.g., "NVMe controller 1") may operate to determine that that memory access command includes an instruction to write data to a particular memory location, and may then perform a mapping database access operation 410 to access the memory mapping included in the mapping database 220 in order to determine that that particular memory location is provided by the memory subsystem 214. However, as discussed in other examples provided below, the one of the storage controller(s) 219 that retrieved the memory access command at block 312 (e.g., "NVMe controller 1") may operate to access the memory mapping in the mapping database 220 in order to determine that that memory access command includes an instruction to write data to a memory location that is included in the memory subsystem 216 as well, and in some embodiments the one of the storage controller(s) 219 that retrieved the memory access command at block 312 (e.g., "NVMe controller 1") may operate to access the memory mapping in the mapping database 220 in order to determine that that memory access command includes instruction(s) to write data to memory locations included in both of the memory subsystem 214 and the memory subsystem 216.

The method 300 then proceeds to block 314 where the storage system uses a connection mapping to identify a first connection to a first processing subsystem for which the first local memory subsystem is provided. In an embodiment, at block 314, the storage controller(s) 219 may perform the mapping database access operation 410 to access the connection mapping included in the mapping database 220 in order to identify a connection between the storage system 218 and the processing subsystem for which the local memory subsystem (which was identified at block 312) is provided. With reference to FIG. 4E, at block 314 and continuing with the specific storage controller example provided above, the one of the storage controller(s) 219 that retrieved the memory access command at block 312 (e.g., "NVMe controller 1") and determined that that memory access command included an instruction to write data to a memory location provided by the memory subsystem 214, may operate to perform the mapping database access operation 410 in order to access the connection mapping and determine that the port 222 is coupled through the connection 210 to the processing subsystem 206 for which the memory subsystem 214 is provided.

However, as discussed in other examples provided below, the one of the storage controller(s) 219 that retrieved the memory access command at block 312 (e.g., "NVMe controller 1") and determined that that memory access command included an instruction to write data to a memory location provided by the memory subsystem 216, may operate to perform the mapping database access operation 410 in order to access the connection mapping and determine that the port 224 is coupled through the connection 212 to the processing subsystem 208 for which the memory subsystem 216 is provided, and in some embodiments the one of the storage controller(s) 219 that retrieved the memory access command at block 312 (e.g., "NVMe controller 1") and determined that that memory access command included instruction(s) to write data to memory locations included in both of the memory subsystem 214 and the memory subsystem 216, may operate to perform the mapping database access operation 410 in order to access the connection mapping and determine that the port 222 is coupled through the connection 210 to the processing subsystem 206 for which the memory subsystem 214 is provided, and that the port 224 is coupled through the connection 212 to the processing subsystem 208 for which the memory subsystem 216 is provided.

The method 300 then proceeds to block 316 where the storage system accesses the first local memory subsystem via the first connection and the first processing subsystem and without utilizing a processing subsystem interconnect in order to execute the memory access command. In an embodiment, at block 316, the storage controller(s) 219 will operate to access the memory subsystem that includes the memory location as identified at block 312 using the connection identified at block 314 to the processing subsystem for which that memory subsystem is provided, which allows for the execution of the memory access command without utilizing any processing subsystem interconnect provided between the processing subsystems.

Figure 4F:
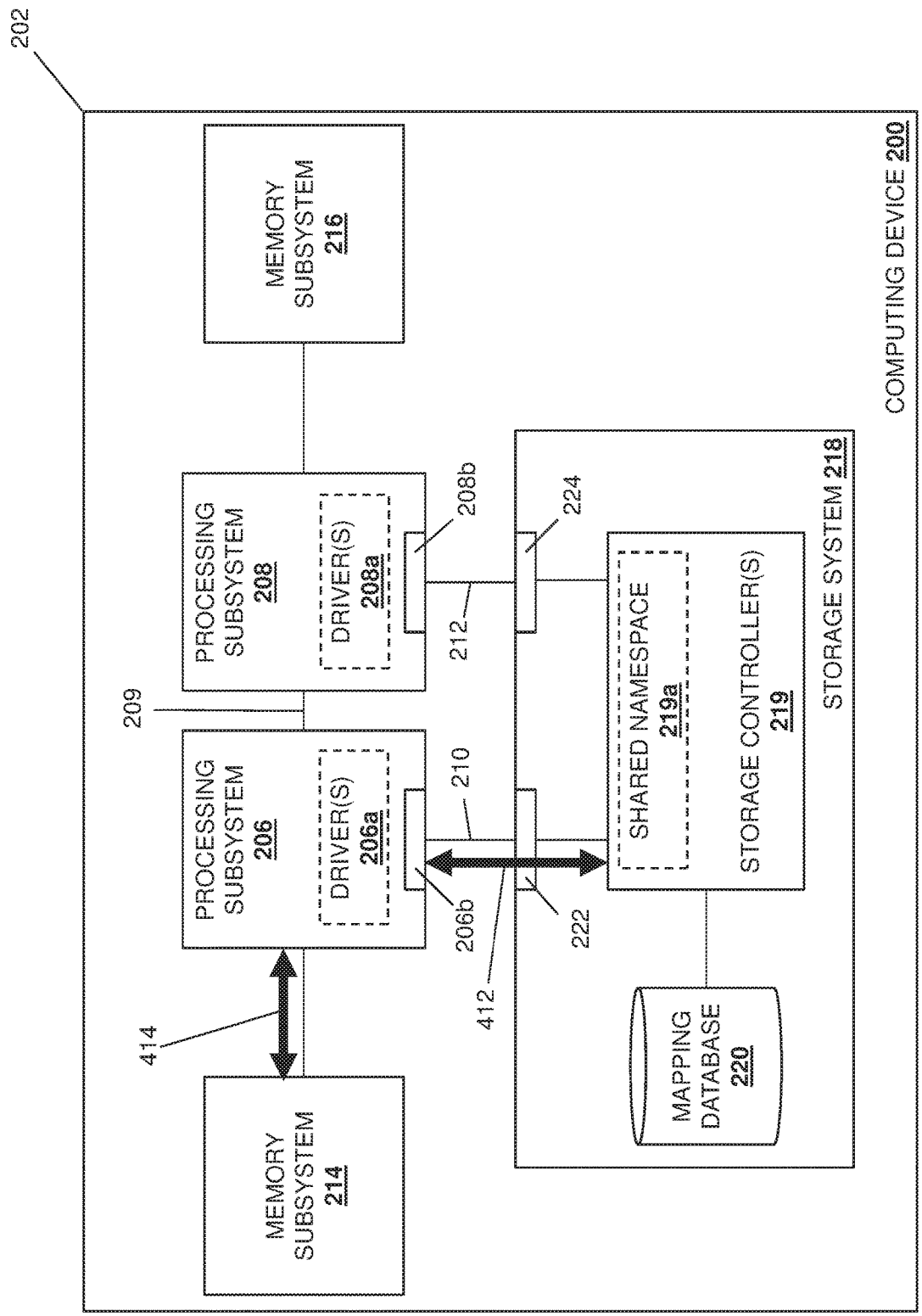
FIG. 4F is a schematic view illustrating an embodiment of the multi-port storage device multi-socket memory access system in the computing device of FIG. 2 operating during the method of FIG. 3.

With reference to FIG. 4F, at block 316 and continuing with the specific storage controller example provided above, the one of the storage controller(s) 219 (e.g., "NVMe controller 1") that identified the memory subsystem 214 as including the memory location at block 312, as well as the port 222 and connection 210 to the processing subsystem 206 for which that memory subsystem 214 is provided at block 314, may cause another of the storage controller(s) 219 (e.g., "NVMe controller 0") to issue a memory access command execution request 412 to the processing subsystem 206 via the port 222 (e.g., a PCIe port), the connection 210 (e.g., a PCIe bus), and the port 206b (e.g., a PCIe root port), which causes the processing subsystem 206 to perform a memory access command execution operation 414 to write data (e.g., that is stored in the storage system 218 and retrieved by the storage controller(s) 219) to the memory location provided by the memory subsystem 214 that was identified in the memory access command. However, as discussed above, while data write operations are described, data read operations and/or any other memory access operations will also fall within the scope of the present disclosure as well.

As such, one of skill in the art in possession of the present disclosure will recognize that the identification of the memory subsystem 214 as including the memory location identified in the memory access command, as well as the identification of the connection 210 to the processing subsystem 206 for which that memory subsystem 214 is provided, allows for the use of that connection 210 and that processing subsystem 206 to execute the memory access operation without the need to utilize the processing subsystem interconnect 209 (e.g., a UPI). This is in contrast to conventional systems which, as discussed above, utilize the same port/connection upon which a memory access command is received in order to perform Direct Memory Access (DMA). As such, to directly contrast with the example provided above, the receipt/retrieval of the memory access command via the port 224/connection 212 by the storage controller(s) 218 in a conventional system would require the storage controller(s) 219 to utilize the port 224/connection 212 to execute that memory access command. Thus, the storage controller(s) 219 in such a conventional system would provide a memory access command execution request (similar to the memory access command execution request 412 of FIG. 4F) to the processing subsystem 208, the processing subsystem 208 would forward that memory access command execution request over the processing subsystem interconnect 209 to the processing subsystem 206, and the processing subsystem 206 would perform a memory access command execution operation (similar to the memory access command execution operation 414 of FIG. 4F) to write data to the memory location identified in the memory access command.

Figure 4G:
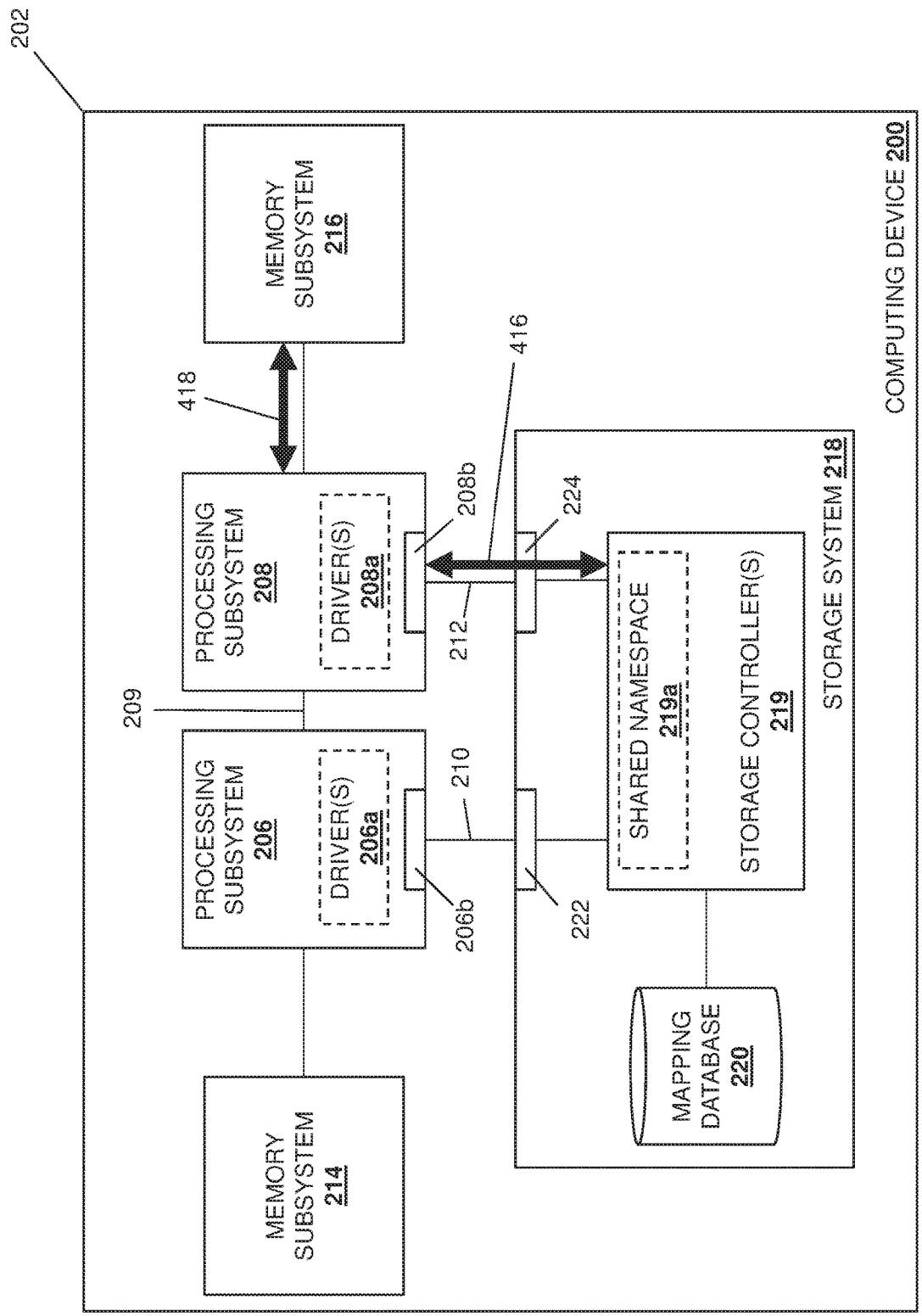
FIG. 4G is a schematic view illustrating an embodiment of the multi-port storage device multi-socket memory access system in the computing device of FIG. 2 operating during the method of FIG. 3.

With reference to FIG. 4G, at block 316 and continuing with the specific storage controller example provided above, when the one of the storage controller(s) 219 (e.g., "NVMe controller 1") identifies the memory subsystem 216 as including the memory location at block 312, as well as the port 224 and connection 212 to the processing subsystem 208 for which that memory subsystem 216 is provided at block 314, that storage controller (e.g., "NVMe controller 1") will issue a memory access command execution request 416 to the processing subsystem 208 via the port 224 (e.g., a PCIe port), the connection 212 (e.g., a PCIe bus), and the port 208b (e.g., a PCIe root port), which causes the processing subsystem 208 to perform a memory access command execution operation 418 to write data (e.g., that is stored in the storage system 218 and retrieved by the storage controller(s) 219) to the memory location that was identified in the memory access command. However, as discussed above, while data write operations are described, data read operations and/or any other memory access operations will also fall within the scope of the present disclosure as well.

In the event that the memory access command includes instruction(s) to write data (or perform some other memory access operation) to memory locations included in both the memory subsystem 214 and the memory subsystem 216, the storage controller(s) 219 may perform two memory access operations (e.g., similar to those illustrated in FIGS. 4F and 4G) in order to execute the memory access command and write data (or perform some other memory access operation) to memory locations in each of the memory subsystem 214 and the memory subsystem 216 in substantially the same manner as discussed above and without utilizing the processing subsystem interconnect 209. However, in other embodiments, in the event that the memory access command includes instruction(s) to write data (or perform some other memory access operation) to memory locations included in both the memory subsystem 214 and the memory subsystem 216, the storage controller(s) 219 may perform a single memory access operation that writes data (or performs some other memory access operation) to a memory location in the memory subsystem 214 using the processing subsystem interconnect 209, while also writing data (or performing some other memory access operation) to the memory subsystem 216 without utilizing the processing subsystem interconnect 209 (i.e., the storage controller(s) 219 may issue memory access command execution request to the processing subsystem 208 to cause it to: 1) write data (or perform some other memory access operation) to the memory subsystem 216, and 2) forward that memory access command execution request over the processing subsystem interconnect 209 to the processing subsystem 206 to cause that processing subsystem 206 to write data (or perform some other memory access operation) to the memory subsystem 214).

The method 300 then returns to block 304 so that the storage system can receive memory access commands and execute those memory access commands in a manner that does not utilize the processing subsystem interconnect(s) between the multiple processing subsystem to which a plurality of its ports are connected. While illustrated and described as being utilized with a two processing subsystem/dual processor configuration, one of skill in the art in possession of the present disclosure will recognize that the teachings of the present disclosure may be extended to more processing subsystems/multi-processor configurations with more than 2 processors. For example, a four processing subsystem/quad processor configuration may couple to the storage subsystem by providing direct connections between the two ports available on the storage system and two of the four processors, which may require additional mappings in the mapping database 220 to compensate for the provisioning of the additional processing subsystem interconnects between those processors.

One of skill in the art in possession of the present disclosure will recognize that the teachings of the present disclosure may provide particular benefits to computing devices such as server devices with multi-processor systems that utilize Layer 3 (L3) caching. For example, some server devices provide Data Direct Input Output (DDIO) caching for devices (e.g., the storage system 218 provided in the examples above) that are locally attached to one of its processors (e.g., each provided by the NUMA processing nodes discussed above), which provides for the writing of data (which destined to be written to local memory subsystems for the processors) to an L3 cache in the processor before it is written to its local memory subsystem in some situations. In conventional versions of such server devices, when the I/O operation (e.g., the memory write command and execution) is local (e.g., the memory write execution is performed on a local memory system for the processor that provided the memory write command), the write is provided in the L3 cache for that processor, and is later written to its local memory subsystem. However, in such conventional versions of such server devices, when the I/O operation is not local (e.g., the memory write execution is performed on a local memory system for a processor that did not provide the memory write command), the write is written directly to the local memory system (or immediately written to that local memory subsystem after being provided in the L3 cache for that processor), which provides for much slower data writes. As such, the teaching of the present disclosure can prevent non-local I/O operations in such server devices, increasing the performance of server devices with multi-processor systems that utilize Layer 3 (L3) caching.

Thus, systems and methods have been described that provide for efficient memory access by a dual-port NVMe SSD storage device connected via each of its first and second ports to respective NUMA processing nodes that are interconnected via a UPI and that are each provided with a respective first local memory subsystem and a second local memory subsystem. When a first storage controller in the dual-port NVMe SSD storage device receives a memory access command from one of the NUMA processing nodes, the first storage controller may utilize a memory mapping that identifies which of the first local memory subsystem and the second local memory subsystem includes a memory location identified in the memory access command, and may utilize a connection mapping that identifies which of the first port and the second port is coupled to the NUMA processing node for which that local memory subsystem is provided. The first storage controller will then execute the memory access command by accessing the local memory subsystem, which includes the memory location identified in the memory access command, through the port that is coupled to the NUMA processing node for which that local memory subsystem is provided, which avoids the use of the UPI between the NUMA processing nodes. As such, dual-port NVMe SSD storage device accesses of local memory subsystems provided for NUMA processing nodes does not require the use of the UPI between those NUMA processing nodes, freeing up its use in, for example, non-local memory accesses by those NUMA processing nodes.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-port storage device multi-socket memory access system, comprising:
    a processing system including a first processing subsystem that includes a first Non-Uniform Memory Access (NUMA) node, and a second processing subsystem that includes a second NUMA node, wherein the first processing subsystem and the second processing subsystem are interconnected by at least one processing subsystem interconnect;
    a memory system that provides a first local memory system for the first processing subsystem and a second local memory subsystem for the second processing subsystem; and
    a storage system including a first port that is connected to the first processing system via a first connection and a second port that is connect to the second processing system via a second connection, wherein the storage system is configured to:
        receive a memory access command;
        determine, using a memory mapping, the first local memory subsystem that is provided by the memory system and that includes a memory location that is identified in the memory access command;
        identify, using a connection mapping, a first connection to the first processing subsystem for which the first local memory subsystem is provided; and
        access the first memory subsystem through the first connection, via the first processing system, and without utilizing the at least one processing subsystem interconnect, in order to execute the memory access command.

2. The system of claim 1, wherein the storage system is configured to:
    receive, from a Basic Input Output System (BIOS), the memory mapping and the connection mapping; and
    store the memory mapping and the connection mapping in a mapping database.

3. The system of claim 1, wherein the storage system is configured to receive the memory access command by:
    receiving, from one of the first processing subsystem via the first connection or the second processing subsystem via the second connection a memory access command notification; and
    retrieving, in response to receiving the memory access command notification, the memory access command from the respective local memory subsystem provided for the processing subsystem from which the memory access command notification was received.

4. The system of claim 1, wherein the storage system is configured to access the first memory subsystem in order to execute the memory access command by:
    writing, through the first connection, data to a cache in the first processing subsystem, wherein the first processing subsystem is configured to copy the data from the cache to the first memory subsystem.

5. An Information Handling System (IHS), comprising:
    a storage device processing system; and
    a storage device memory system that is coupled to the storage device processing system and that includes instructions that, when executed by the storage device processing system, cause the storage device processing system to provide at least one storage controller that is configured to:
        receive, from a Basic Input Output System (BIOS), a memory mapping and a connection mapping;
        store the memory mapping and the connection mapping in a mapping database;
        receive a memory access command;
        determine, using the memory mapping, a first local memory subsystem that includes a memory location that is identified in the memory access command;

identify, using the connection mapping, a first connection to a first processing subsystem for which the first local memory subsystem is provided; and access the first memory subsystem through the first connection, via the first processing system, and without utilizing at least one processing subsystem interconnect that connects the first processing subsystem to at least one second processing subsystem, in order to execute the memory access command.

6. The IHS of claim 5, wherein the at least one storage controller that is configured to:

receive, from a Basic Input Output System (BIOS), the memory mapping and the connection mapping; and store the memory mapping and the connection mapping in a mapping database.

7. The IHS of claim 5, wherein the at least one storage controller is configured to receive the memory access command by:

receiving, from one of the first processing subsystem and the at least one second processing subsystem via a respective connection provided to that processing subsystem, a memory access command notification; and retrieving, in response to receiving the memory access command notification, the memory access command from a respective local memory subsystem provided for the processing subsystem from which the memory access command notification was received.

8. The IHS of claim 5, wherein the at least one storage controller is configured to access the first memory subsystem in order to execute the memory access command by:

writing, through the first connection, data to a cache in the first processing subsystem, wherein the first processing subsystem is configured to copy the data from the cache to the first memory subsystem.

9. The IHS of claim 5, wherein the IHS is a dual-port storage device having a first port and the second port, and wherein:

the first processing subsystem is connected to a first port on the dual-port storage device by the first connection; and a second processing subsystem is provided a second local memory subsystem, and is connected to a second port on the dual-port storage device by a second connection.

10. The IHS of claim 9, wherein the first processing subsystem is provided by a first Non-Uniform Memory Access (NUMA) node, and wherein the second processing subsystem is provided by a second NUMA node.

11. The IHS of claim 1, wherein dual-port storage device is a Non-Volatile Memory express (NVMe) storage device.

12. A method for multi-socket memory access via a multi-port storage device, comprising:

receiving, by at least one storage controller from a Basic Input Output System (BIOS), a memory mapping and a connection mapping;

storing, by the at least one storage controller, the memory mapping and the connections mapping in a mapping database;

receiving, by at least one storage controller, a memory access command;

determining, by the at least one storage controller using the memory mapping, a first local memory subsystem that includes a memory location that is identified in the memory access command;

identifying, by the at least one storage controller using the connection mapping, a first connection to a first processing subsystem for which the first local memory subsystem is provided; and accessing, by the at least one storage controller, the first memory subsystem through the first connection, via the first processing system, and without utilizing at least one processing subsystem interconnect that connects the first processing subsystem to at least one second processing subsystem, in order to execute the memory access command.

13. The method of claim 12, wherein the receiving the memory access command includes:

receiving, by the at least one storage controller from one of the first processing subsystem and the at least one second processing subsystem via a respective connection provided to that processing subsystem, a memory access command notification; and retrieving, by the at least one storage controller in response to receiving the memory access command notification, the memory access command from a respective local memory subsystem provided for the processing subsystem from which the memory access command notification was received.

14. The method of claim 12, wherein the accessing the first memory subsystem in order to execute the memory access command includes:

writing, by the at least one storage controller through the first connection, data to a cache in the first processing subsystem, wherein the first processing subsystem is configured to copy the data from the cache to the first memory subsystem.

15. The method of claim 12, wherein the at least one storage controller is included in a dual-port storage device having a first port and the second port, and wherein:

the first processing subsystem is connected to a first port on the dual-port storage device by the first connection; and a second processing subsystem is provided a second local memory subsystem, and is connected to a second port on the dual-port storage device by a second connection.

16. The method of claim 15, wherein the first processing subsystem is provided by a first Non-Uniform Memory Access (NUMA) node, and wherein the second processing subsystem is provided by a second NUMA node.

17. The method of claim 15, wherein dual-port storage device is a Non-Volatile Memory express (NVMe) storage device.

* * * * *